(12) United States Patent
Suzuki et al.

(10) Patent No.: US 8,398,926 B2
(45) Date of Patent: Mar. 19, 2013

(54) EXHAUST GAS PURIFYING APPARATUS

(75) Inventors: Kozo Suzuki, Kobe (JP); Yoji Fukami, Kakogawa (JP); Makoto Furukawa, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 363 days.

(21) Appl. No.: 12/739,384

(22) PCT Filed: Nov. 7, 2008

(86) PCT No.: PCT/JP2008/003227
§ 371 (c)(1),
(2), (4) Date: Apr. 22, 2010

(87) PCT Pub. No.: WO2009/063602
PCT Pub. Date: May 22, 2009

(65) Prior Publication Data
US 2010/0257851 A1    Oct. 14, 2010

(30) Foreign Application Priority Data

Nov. 15, 2007    (JP) ................................. 2007-297106

(51) Int. Cl.
*B01D 50/00*    (2006.01)
(52) U.S. Cl. ........................ 422/180; 422/177
(58) Field of Classification Search .................. 422/177, 422/180; 502/325
See application file for complete search history.

(56) References Cited

U.S. PATENT DOCUMENTS

| 5,403,559 | A  | * | 4/1995 | Swars | ........................... 422/180 |
| 5,768,889 | A  |   | 6/1998 | Maus et al. | |
| 6,375,910 | B1 | * | 4/2002 | Deeba et al. | ................ 423/239.1 |
| 7,718,150 | B2 | * | 5/2010 | Theis et al. | ................ 423/213.2 |
| 2005/0170953 | A1 | * | 8/2005 | Shirahata et al. | ............. 502/325 |
| 2009/0124492 | A1 |   | 5/2009 | Kitamura et al. | |

FOREIGN PATENT DOCUMENTS

| JP | 58-079088 | 5/1983 |
| JP | 60-17220 | 1/1985 |
| JP | 03-094836 | 4/1991 |
| JP | 06-023274 | 2/1994 |
| JP | 10-506167 | 6/1998 |
| WO | 2007/010899 | 1/2007 |

OTHER PUBLICATIONS

English Translation of PCT International Preliminary Report on Patentability with Written Opinion for PCT/JP2008/003227, dated Jul. 8, 2010, 6 pages.
Japanese Application No. 2007-297106 Notification of Reason(s) for Rejection dated May 8, 2012, 4 pages, including English translation.
PCT International Preliminary Report on Patentability with Written Opinion for PCT/JP2008/003227, dated Jun. 29, 2010, 6 pages.
European Application No. 08849217.8 Extended and Supplementary Search Report dated Jun. 22, 2012, 4 pages.
Japanese Patent Application No. 2007-297106 Decision of Grant mailed Jan. 8, 2013, 3 pages.

* cited by examiner

*Primary Examiner* — Tom Duong

(57) ABSTRACT

A plurality of catalytic units (42) and (43) are disposed in series with each other in a direction conforming to the direction (X) of flow of the exhaust gases (G) and include respective honeycomb carrier structure each having a catalyst deposited thereon. Of the plural catalytic units, at least two catalytic units (42) and (43), which are positioned downstream and upstream relative to each other with respect to the direction (X) of flow of the exhaust gases (G), respectively, are such that the downstream catalytic unit (42) has a higher cell density, a smaller capacity of the honeycomb carrier structure and a larger amount of an element, due to become a major catalyst, carried thereby per unitary capacity than those in the upstream catalytic unit (43).

15 Claims, 3 Drawing Sheets

EXHAUST GAS PURIFYING APPARATUS

CROSS REFERENCE TO THE RELATED APPLICATION

This application is based on and claims Convention priority to Japanese patent application No. 2007-297106, filed Nov. 15, 2007, the entire disclosure of which is herein incorporated by reference as a part of this application.

FIELD OF THE INVENTION

The present invention relates to an exhaust gas purifying apparatus for substantially purifying exhaust gases by means of a catalytic reaction, which apparatus is disposed on an exhaust passage for discharging the exhaust gases from a combustion engine in an automotive vehicle.

BACKGROUND ART

Automotive vehicles such as, for example, motorcycles and four wheeled vehicles make use of a catalytic converter disposed on an exhaust passage for removing HC (hydrocarbon), CO (carbon monoxide) and $NO_X$ (nitrogen oxides) components, contained in exhaust gases emitted from a combustion engine, by means of a catalytic reaction. This is disclosed in, for example, the JP Laid-open Patent Publication No. S60-17220, first published Jan. 29, 1985. The catalytic converter referred to above is of a structure including a honeycomb carrier structure carrying platinum and rhodium deposited on a multiplicity of surfaces thereof.

In an attempt to reduce the size and the cost of manufacture of the catalytic converter, it has hitherto been contemplated to increase the number of cells, which are elongated pores in the honeycomb carrier structure, to thereby increase the cell density and also to reduce the amount of rhodium, which is an element employed as a major catalyst, that is used in the catalytic converter. More specifically, increase of the cell density results in increase of the total surface area of the honeycomb carrier structure (hereinafter referred to as the honeycomb surface area, which in turn results in increase of the capability of substantially purifying the exhaust gases, and, therefore, for a given exhaust gas purifying performance, the honeycomb carrier structure can be reduced in size and manufactured at a reduced cost. On the other hand, although rhodium is a catalyst element currently considered the most excellent catalyst in exhaust gas purifying capability, it is expensive, and therefore, the manufacturing cost would be reduced considerably if the intended exhaust gas purifying capability can be made available while the amount of rhodium used is reduced.

It has, however, been found that if the cell density is increased to a value equal to or higher than about 400 cells per square inch, the maximum catalyst internal temperature, which is induced when unburned components of the exhaust gases flow from the combustion engine, will increase with increase of the cell density, but the minimum catalyst internal temperature on the other hand will scarcely change, resulting in increase of the difference in temperature between the maximum and minimum temperatures. Also, in order to increase the cell density, it is needed to increase the thickness of each of annular flat plates and annular undulated plates both forming respective parts of the honeycomb carrier structure. Accordingly, the durability of the flat and undulated plates, each having a small thickness, will be lowered when they are repeatedly thermally contracted by the effect of a relatively large difference in temperature between those catalyst internal temperatures.

It is to be noted that the catalyst internal temperature referred to hereinbefore and hereinafter means the temperature occurring internally of a tubular casing of the catalyst converter, in which a multiplicity of cells are arranged, not the temperature of an outer peripheral surface of the tubular casing of the catalyst converter.

On the other hand, since rhodium is a major catalyst element excellent in overall capability of substantially removing particularly both of HC and CO compounds as compared with that of any other catalyst elements, the amount of rhodium carried is hardly reduced in the face of the required or desired exhaust gas purifying performance.

SUMMARY OF THE INVENTION

In view of the foregoing, the present invention has for its essential object to provide an exhaust gas purifying apparatus having an increased exhaust gas purifying capability and capable of being manufactured in a compact size and at a reduced cost without incurring any reduction in durability.

In order to accomplish the foregoing and some other objects of the present invention, there is provided in accordance with the present invention, an exhaust gas purifying apparatus disposed on an exhaust passage, through which exhaust gases emitted from a combustion engine flows, for purifying those exhaust gases by means of a catalytic reaction. The exhaust gas purifying apparatus includes a plurality of catalytic units disposed in series with each other in a direction conforming to the direction of flow of the exhaust gases. Each of those catalytic units in turn includes a honeycomb carrier structure and a catalyst carried by the honeycomb carrier structure. In at least two of the plural catalytic units referred to above, one of those at least two catalytic units positioned downstream of the other of the catalytic units, that is, a downstream catalytic unit with respect to the direction of flow of the exhaust gases has a higher cell density, a smaller capacity of the honeycomb carrier structure and a larger amount of an element, due to become a major catalyst, carried thereby per unitary capacity than those in the upstream catalytic unit.

It is to be noted that the element due to become the major catalyst, referred to above and hereinafter, is intended to mean, where a plurality of catalyst elements are available, one of those catalyst elements having the highest overall capability of substantially removing particularly both of HC and CO compounds, or a catalyst element that is excellent in purifying capability, but is unacquirable because of an insignificant quantity thereof being placed in the market.

The exhaust gas purifying capability generally depends on the honeycomb surface area on which the catalyst is carried, and not on the total amount of the catalyst used. According to the present invention, the downstream catalytic unit has an exhaust gas purifying capability increased with increase of the honeycomb surface area, brought about by the higher cell density than that of the upstream catalytic unit, and, accordingly, compactization can be accomplished in a quantity corresponding to the purifying capability increased, particularly where a required or desired purifying performance is to be secured. Also, since in contrast to the total amount of the catalyst, which is proportional to the capacity or volume of the honeycomb carrier structure, the downstream catalytic unit makes use of the honeycomb carrier structure of a capacity smaller than that in the upstream catalytic unit, the total amount of the catalyst including the major catalyst element can be reduced in a quantity corresponding to the capacity of the honeycomb carrier structure reduced even though the amount of the catalyst carried per unitary capacity is so large as to secure the required or desired purifying performance, thus allowing the cost to be reduced.

On the other hand, since the upstream catalytic unit has the cell density lower than that of the downstream catalytic unit, the maximum value of the catalyst internal temperature will not become higher than that of the honeycomb carrier structure having a high cell density even when the unburned exhaust gases flow from the combustion engine into such catalytic unit and, therefore, the difference in temperature between the highest possible value and the lowest possible value of the catalyst internal temperature will not be so large enough to make it difficult for a large thermal contraction to occur and, hence, a sufficient durability can be secured. Also, since the unburned exhaust gases from the combustion engine will not flow directly into the catalytic unit although the downstream catalytic unit has a relatively high cell density, a large temperature difference will hardly occur internally of the catalyst and, therefore, this is particularly advantageous in respect of the durability.

In the practice of the present invention, the major catalyst element referred to above is preferably rhodium. Although this rhodium is an expensive rare metal because of an insignificant quantity of rhodium being marketed, the amount of rhodium used in the practice of the present invention can be reduced in a quantity corresponding to the capacity of the honeycomb carrier structure of the downstream catalytic unit reduced. Therefore, not only can the cost of purchasing the material be reduced, but also a required amount of rhodium can readily be secured even when the production of the catalyst units increases.

Where the major catalyst element is employed in the form of rhodium as described above, the honeycomb carrier structure of the downstream catalytic unit is preferably designed to carry a catalyst composition of a kind containing rhodium and platinum, in which the weight based percentage of platinum used is higher than that of rhodium used. By so doing, a high catalyzing capability exhibited by the platinum is utilized to allow the catalytic unit to exhibit an excellent catalyzing capability so that the amount of the expensive rhodium used can be reduced.

Preferably, palladium may be contained in the catalyst employed in the upstream catalytic unit. The additional use of the palladium allows HC compound, contained in the exhaust gases, to be reacted in the presence of palladium when unburned components of the exhaust gases containing a high density of fuel flow into the upstream catalytic unit. Accordingly, with the use of the inexpensive palladium, a desired exhaust gas purifying performance can be obtained and the cost can also be reduced.

Where the catalyst used in the upstream catalytic unit contain palladium as described above, such catalyst is preferably of a composition containing rhodium and palladium, the amount of palladium used being greater in weight based percentage than the amount of rhodium used. When a large amount of palladium is used, the amount of the expensive rhodium used can be saved.

In a preferred embodiment of the present invention, the upstream and downstream catalytic units may be retained within a single tubular casing having a longitudinal axis conforming to the direction of flow of the exhaust gases and are axially spaced a distance from each other. Since this allows each of the catalytic converters, employing of the upstream and downstream catalytic units, to be manufactured in the form of a single assembly, the handleability can be increased.

Also, even though variation occurs in degree of substantial purification of the introduced exhaust gases per cell under the influence of a temperature distribution and a gas distribution within the upstream catalytic unit, since the exhaust gases emerging outwardly from the cells in the upstream catalytic unit are, after mixed in a space between the two catalytic units, subsequently introduced into the cells in the downstream catalytic unit so that the exhaust gases can be again purified substantially, the exhaust gases can be purified with no local variation occurring from cell to cell and as a result, the purifying capability can thus be increased.

In the practice of the present invention, the honeycomb carrier structure of the downstream catalytic unit is preferably made of a metallic material. In this case, the honeycomb carrier structure of the downstream catalytic unit has a cell density preferably equal to or higher than 400 cells per square inch, more preferably equal to or higher than 500 per square inch, and yet preferably equal to or lower than 600 cells per square inch, but not higher than 800 cells per square inch, at which the resistance to the flow of the exhaust gas will not become excessive, whatever any of those preferred cell densities is chosen.

If the cell density exceeds 400 cells per square inch, it may occur that the maximum catalyst internal temperature may abruptly increase with the difference between the maximum temperature and the minimum temperature expanded consequently and, therefore, it cannot be employed in the upstream catalytic unit, into which the exhaust gases of an elevated temperature or containing unburned components flow directly. However, since the exhaust gases once substantially purified in the upstream catalytic unit flow into the downstream catalytic unit and, hence, the difference between the maximum catalyst internal temperature and the minimum catalyst internal temperature is smaller than that exhibited when the cell density in the upstream catalytic unit is 200 cells per square inch, the use of the cell density in excess of 400 cells per square inch in the downstream catalytic unit will not bring about any reduction in durability thereof. The downstream catalytic unit has the honeycomb surface area increased in correspondence with the high cell density in excess of 400 cells per square inch and, hence, the purifying capability increases correspondingly. Also, where a required purifying capability is desired, the downstream catalytic unit can be assembled compact in size.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
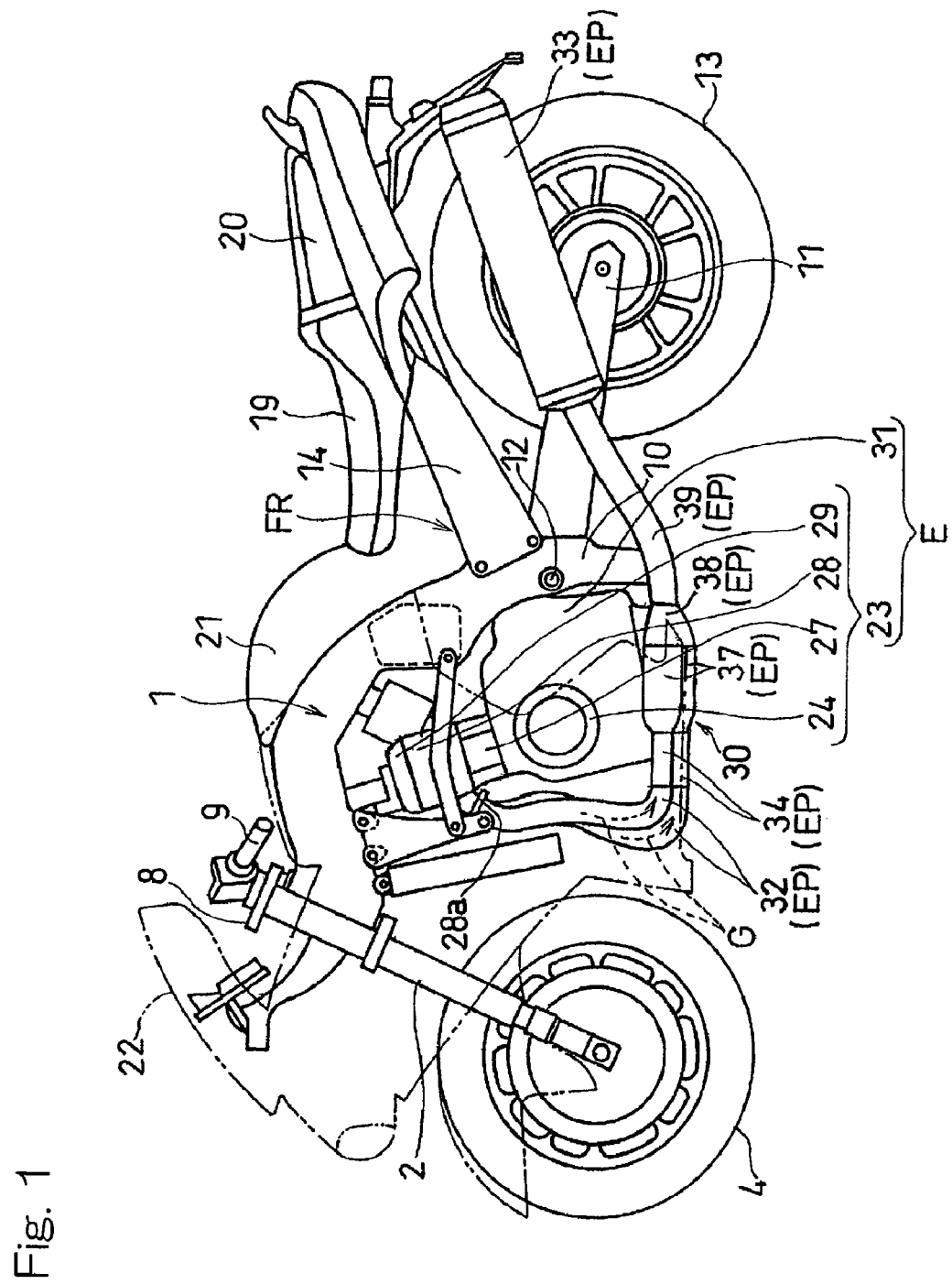
FIG. 1 is a schematic side view showing a motorcycle, in which an exhaust gas purifying apparatus according to a preferred embodiment of the present invention is incorporated.

A preferred embodiment of the present invention will now be described in detail with particular reference to the accompanying drawings. FIG. 1 illustrates a schematic side view of a motorcycle having an exhaust gas purifying apparatus 30 according to a preferred embodiment of the present invention mounted thereon. The illustrated motorcycle is of a structure including a motorcycle frame structure FR having a main frame 1, forming a front frame portion of the motorcycle frame structure FR, and a front fork 2 is pivotally mounted on a front portion of the main frame 1 with a front wheel 4 rotatably supported by a lower end of the front fork 2. A steering handlebar 9 is mounted on an upper bracket 8, which concurrently supports an upper end of the front fork 2. A rear lower portion of the main frame 1 is formed with a swingarm bracket 10, and a swingarm 11 has its front end connected with this swingarm bracket 10 through a pivot pin 12 for movement up and down about the pivot pin 12. A rear drive wheel 13 is rotatably supported by a rear end of the swingarm 11 in any manner know to those skilled in the art. Seat rails 14 are connected rigidly with a rear portion of the main frame 1 and forming a rear frame portion of the motorcycle frame structure FR. A combustion engine E is mounted on a lower intermediate portion of the main frame 1 and is drivingly coupled with the rear wheel 13 through a drive transmitting member (not shown) such as, for example, a substantially endless chain or belt in any manner known to those skilled in the art.

The seat rails 14 referred to above includes a motorcycle rider's seat 19 and a passenger's seat 20 both mounted thereon, and a fuel tank 21 containing an amount of fuel is positioned above the main frame 1, that is, at an upper portion of the motorcycle frame structure and generally intermediate between the handlebar 9 and the rider's seat 19. A fairing 22 made of a synthetic resin is mounted on a front portion of the motorcycle frame structure for covering a region ranging from forwardly of the handlebar 9 to opposite sides of the front portion of the motorcycle body.

In the illustrated embodiment, the combustion engine E arranged generally intermediate between the front wheel 4 and the rear wheel 13 is employed in the form of, for example, a four cylinder, four stroke combustion engine and has an engine body 23, which includes a crankcase 24, a cylinder block 27, a cylinder head 28 mounted atop the cylinder block 27 and a cylinder head cover 29 overhanging the cylinder head 28 and a transmission unit 31.

The illustrated motorcycle also includes an exhaust system for discharging exhaust gases G, emitted from the combustion engine E, to the atmosphere. This exhaust system in turn includes four exhaust tubes 32 fluid connected at an upstream end with respective exhaust ports 28a, defined in the cylinder head 28, for guiding the exhaust gases G in a direction forwardly and downwardly from the combustion engine E. The exhaust system furthermore includes two intermediate exhaust collecting tubes 34, each fluid connected with respective downstream ends of two of the four exhaust tubes 32, two catalytic tubes 37 each fluid connected with a rear end of the associated intermediate exhaust collecting tube 34, and a single exhaust collector tube 38 fluid connected with respective downstream ends of the two catalytic tubes 37. The exhaust collector tube 38 has a downstream end fluid connected with a muffler 33 through a connecting tube 39.

Those various tubes, including the exhaust tubes 32, the intermediate exhaust tubes 34, the catalytic tubes 37, the exhaust collector tube 38 and the connecting tube 39, and the muffler 33 altogether form an exhaust passageway ER. The exhaust gas purifying apparatus 30 designed in accordance with the present invention is disposed on this exhaust passageway EP for substantially purifying exhaust gases G by means of a catalytic reaction as will be detailed subsequently.

Figure 2:
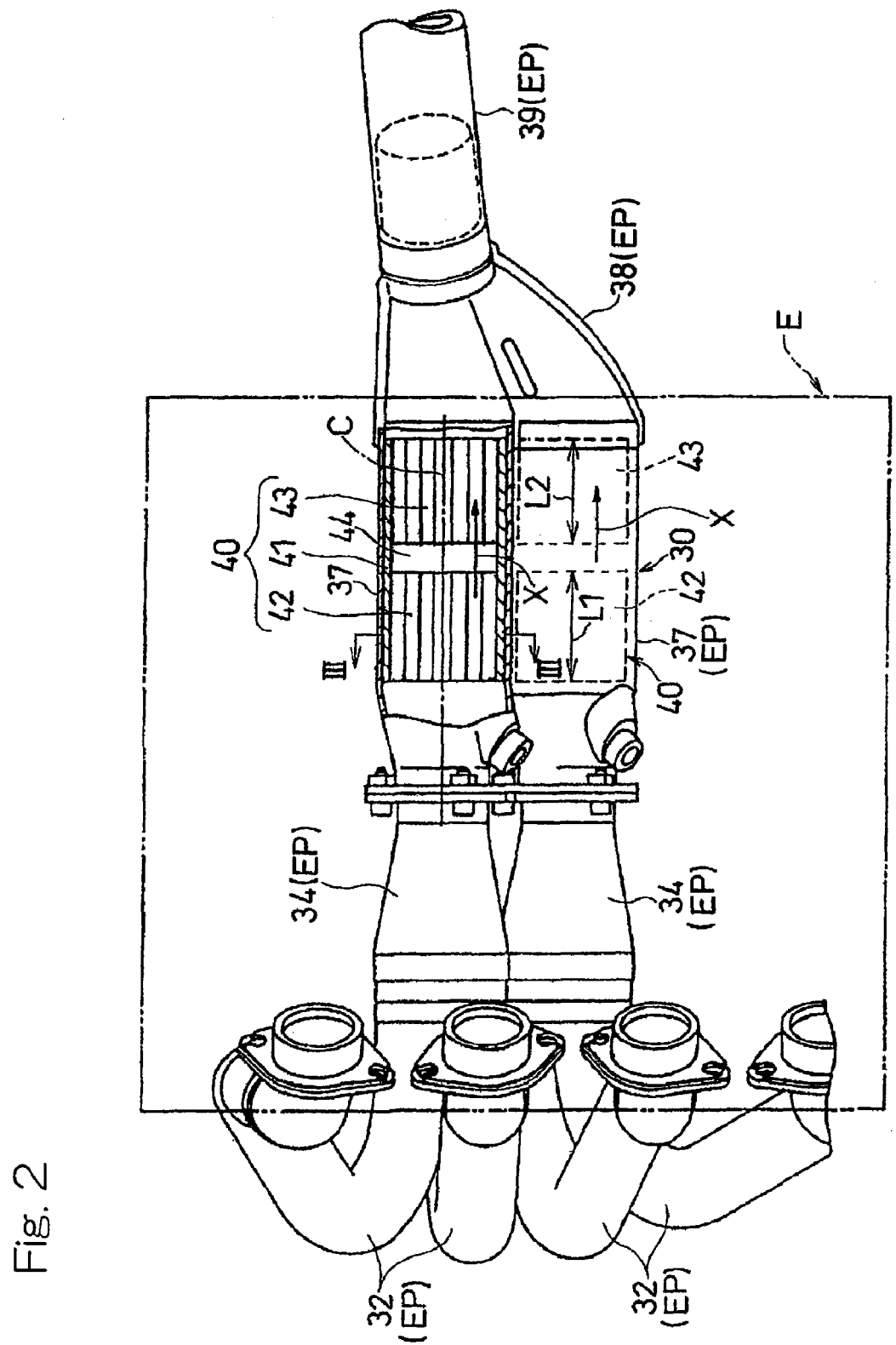
FIG. 2 is a top plan view, on an enlarged scale, showing the exhaust gas purifying apparatus shown in FIG. 1.

FIG. 2 illustrates the exhaust gas purifying apparatus 30 in a top plan representation on an enlarged scale. A catalytic converter 40 forming a part of the exhaust gas purifying apparatus 30 is accommodated within each of the catalytic tubes 37 referred to above. This catalytic converter 40 includes a single tubular casing 41 and upstream and downstream catalytic units 42 and 43 housed within the tubular casing 41 in a series connected relation with each other in a direction conforming to the direction X of flow of the exhaust gases G. Those upstream and downstream catalytic units 42 and 43 in each of the catalytic tubes 37 are spaced a distance from each other in a direction conforming to the longitudinal axis C of the associated tubular casing 41, that is, the direction X of flow of the exhaust gases, with a space 44 defined between those upstream and downstream catalytic units 42 and 43. Each of the tubular casings 41 is made of a metallic material such as, for example, stainless steel and a portion of the respective tubular casing 41 generally aligned with the space 44 defined between the upstream and downstream catalytic units 42 and 43 is fixed to the associated catalytic tube 37 by means of welding.

Figure 3:
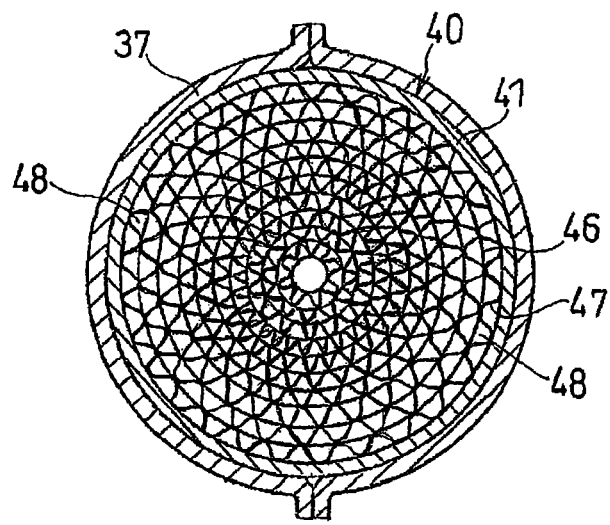
FIG. 3 is a cross-sectional view taken along the line in FIG. 2, showing one of catalytic units on an enlarged scale.

Each of the upstream and downstream catalytic units 42 and 43 is of a type, in which the catalyst is carried by any known honeycomb carrier structure. More specifically, as shown in FIG. 3 showing on an enlarged scale in a cross sectional representation taken along the line in FIG. 2, the upstream catalytic unit 42 includes a honeycomb carrier structure of a substantially round sectional configuration, in which a plurality of annular flat plates 46 and a corresponding number of annular undulated or corrugated plates 47 are alternately and coaxially positioned with one undulated plate 47 sandwiched between the neighboring flat plates 46 to define a multiplicity of substantially elongated passages or cells 48 extending in a direction substantially parallel to the longitudinal axis C for the flow of the exhaust gases G therethrough. The flat plates 46 and the undulated plates 47 carry the catalyst deposited thereon as will be detailed subsequently.

It is to be noted that the honeycomb carrier structure may not be necessarily limited to the one having the round sectional configuration such as described above, but may have a polygonal sectional configuration such as, for example, a hexagonal sectional configuration.

The downstream catalytic unit 43 shown in FIG. 2 is similarly comprised of a honeycomb carrier structure substantially similar in shape to that of the upstream catalytic unit 42 described above, but having the honeycomb carrier structure of a cell density different from that of the honeycomb carrier structure employed in the upstream catalytic unit 42 by the reason which will be described later. The cell density referred to hereinbefore and hereinafter means the density of the cells 48 employed per unitary capacity of the honeycomb carrier structure employed in each of the upstream and downstream catalytic units 42 and 43.

As hereinabove described, the downstream catalytic unit 43 includes the honeycomb carrier structure having a cell density higher than that of the honeycomb carrier structure employed in the upper stream catalytic unit 42. By way of example, the cell density in the upstream catalytic unit 42 is chosen to be 300 cells per square inch as has hitherto been employed, but the cell density of the downstream catalytic unit 43 is chosen to be 600 cells per square inch.

Also, the capacity of the honeycomb carrier structure (hereinafter referred to as the honeycomb capacity) in the downstream catalytic unit 43 is smaller than that of the honeycomb carrier structure in the upstream catalytic unit 42. In other words, although the upstream and downstream catalytic units 42 and 43 are of the substantially identical sectional configuration, having substantially identical diameters, the length L2 of the downstream catalytic unit 43 as measured in a direction conforming to the longitudinal axis C thereof is smaller than the length L1 of the upper catalytic unit 42 as measured similarly.

For the catalyst carried by the honeycomb carrier structure, rhodium and platinum have hitherto been generally employed and, in particular, rhodium has been largely used as a so-called major catalyst element because it has the highest capability of substantially purifying CO, HC and $NO_X$ compounds contained in the exhaust gases. However, rhodium is an expensive element and is marketed in insignificant quantities and, therefore, in the event that the production of the exhaust gas purifying apparatuses 30 increases, it may be expected that it would become difficult to secure the required amount of the major catalyst element.

In view of the above, in order to save the resource of rhodium, the embodiment now under discussion makes use of the upstream catalytic unit 42 comprised of the honeycomb carrier structure having deposited thereon a catalyst composition of a kind containing palladium and rhodium, in which the proportion (the weight based percentage) of palladium used is greater than that of the rhodium used, and, also, make use of the downstream catalytic unit 43 comprised of the honeycomb carrier structure having deposited thereon a catalyst composition of a kind containing platinum and rhodium, in which the proportion of platinum used is greater than that of rhodium used. It is to be noted that the amount of rhodium, which is used as a major catalyst element and is carried by the corresponding honeycomb carrier structure per unit capacity, is so chosen as to be greater in the downstream catalytic unit 43 than in the upstream catalytic unit 42.

Hereinafter, the operation of the exhaust gas purifying apparatus 30 will be described. Exhaust gases G emitted from the combustion engine E shown in FIG. 1 are guided to flow from the four exhaust ports 28a, defined in the cylinder head 28, into the associated exhaust tubes 32. The exhaust gases G so introduced into the four exhaust tubes 32 are then merged into two streams, which flow through the intermediate exhaust collecting tubes 34 and then through the catalytic tubes 37, respectively, and are thereafter discharged to the atmosphere through the exhaust collector tube 38 and then through the connecting tube 39 by way of the muffler 33.

As best shown in FIG. 2, the exhaust gases G introduced from the four exhaust tubes 32 into the catalytic tubes 37 by way of the intermediate collecting tubes 34 flow through the upstream and downstream catalytic units 42 and 43 of each of the catalytic converters 40 that are accommodated respectively within the catalytic tubes 37. The exhaust gases G flowing through the upstream and downstream catalytic units 42 and 42 of each of the catalytic converters 40 in the manner described above are substantially purified by the catalytic reaction taking place in each of the upstream and downstream catalytic units 42 and 43.

When the exhaust gases G flows through the cells 48 shown in FIG. 3, it may occur that the degree of reaction taking place at portions of the cells 48, which contact surfaces of the flat plates 48 or the undulated plates 47, and the degree of reaction taking place at center portions of the cells 48, which do not contact surfaces of the flat plates 48 or the undulated plates 47 are different from each other. As a result, the extent to which the exhaust gases G are substantially purified after they have passed through the upstream catalytic unit 42 shown in FIG. 2 may vary within the transverse section, but those exhaust gases are, after having once been mixed within the space 44 delimited between the upstream and downstream catalytic units 42 and 43, again purified substantially within the downstream catalytic unit 43. Accordingly, the exhaust gases are substantially purified with no local variation occurring from place to place and the purifying capability can thus be increased.

Figure 4:
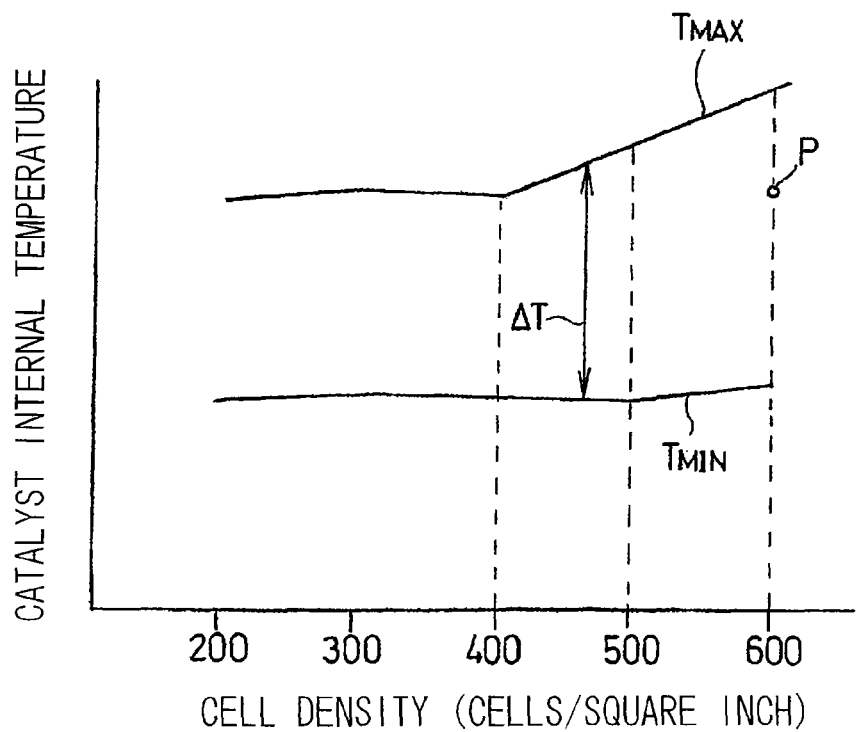
FIG. 4 is a characteristic chart showing the relation between the cell density and the catalyst internal temperature of the catalytic converter in the exhaust gas purifying apparatus, shown in FIG. 1.

FIG. 4 is a characteristic chart showing the relation between the cell density and the catalyst internal temperature of each of the catalytic converters 40, which chart was obtained as a result of a series of endurance tests carried out with the motorcycle under a predetermined pattern. Legends "$T_{MAX}$" and "$T_{MIN}$" shown in FIG. 4 represent the maximum value of the catalyst internal temperature and the minimum value of the catalyst internal temperature, respectively; and $\Delta T$ represents the temperature difference between the maximum catalyst internal temperature $T_{MAX}$ and the minimum catalyst internal temperature $T_{MIN}$. The minimum catalyst internal temperature $T_{MIN}$ represents the temperature measured at the time the motorcycle under the series of endurance tests was driven in a stabilized mode, and is substantially constant regardless of the cell density. On the other hand, the maximum catalyst internal temperature $T_{MAX}$ tends to abruptly increase proportionally when the cell density is of a value equal to or higher than 400 cells per square inch, accompanied by a corresponding increase of the temperature difference $\Delta T$.

The reason for the increase of the maximum catalyst internal temperature $T_{MAX}$ with increase of the cell density as discussed above is as follows. At the time of an abrupt deceleration mode during the endurance tests, in the combustion engine E shown in FIG. 1, a throttle valve is closed with a reduced amount of air introduced into the combustion engine, but fuel sticking to wall surfaces of the intake port flows into the combustion chamber. Therefore, the air-fuel mixture introduced into the combustion chamber will be enriched in admixture of the fuel so flowing into the combustion chamber to such an extent as to result in an incomplete combustion. Once the incomplete combustion occurs, the exhaust gases containing substantial amounts of CO and HC will be discharged from the exhaust ports 28a.

On the other hand, with the catalytic converter 40 of the structure shown in and described with particular reference to FIG. 2, if the cell density increases, the heat value per unitary surface area increases with increase of the number of the cells. In other words, since the capability of substantially purifying the exhaust gases G increases, the catalytic reaction with CO and HC, which tend to be generated in a large amount at the time of the abrupt deceleration mode described above, can be promoted, resulting in increase of the maximum catalyst internal temperature $T_{MAX}$.

Also, the honeycomb carrier structure having a high cell density does not only require the use of a foil-like metal plate having a small thickness for each of the flat and undulated plates employed in each of the catalytic units, but also incurs increase of the temperature difference $\Delta T$ between the maximum catalyst internal temperature $T_{MAX}$ and the minimum catalyst internal temperature $T_{MIN}$ with the maximum catalyst internal temperature $T_{MAX}$ increased. Accordingly, the honeycomb carrier structure having such a high cell density is susceptible to reduction in durability when it undergoes thermal contraction repeatedly by the effect of the large temperature difference ΔT.

For the reason discussed above, the upstream catalytic unit 42 of each of the catalytic converters 40 is susceptible to reduction in durability with increase of the cell density since the exhaust gases G of a high temperature are introduced thereinto from the combustion engine E. In view of this, the upstream catalytic unit 42 of each of the catalytic converters 40 makes use of the honeycomb carrier structure having a cell density of about 300 cells per square inch and, hence, having a small temperature difference ΔT between the maximum and minimum catalyst internal temperatures as shown in FIG. 4.

On the other hand, although the downstream catalytic unit 43 of each of the catalytic converters 40 shown in FIG. 2 makes use of the honeycomb carrier structure having a cell density of 600 cells per square inch, since the exhaust gases G once substantially purified by the upstream catalytic unit 42 flow into such downstream catalytic unit 43, it will scarcely affected by influences brought about by the previously discussed incomplete combustion and, therefore, the maximum catalyst internal temperature $T_{MAX}$ thereof can be lowered to a point shown by P in FIG. 4. Accordingly, the temperature difference ΔT is of a value about comparable with that exhibited when the catalytic unit has a cell density equal to or lower than 200 cells per square inch and, thus, an advantage can be appreciated in terms of the durability.

As hereinabove discussed, a sufficient durability can be secured in each of the catalytic converters 40 shown in FIG. 2.

Reviewing the characteristic chart of FIG. 4, the upstream catalytic unit 42 of each of the catalytic converters 40 is preferred to have a cell density lower than 400 cells per square inch so that the temperature difference ΔT will not increase unduly and, on the other hand, the downstream catalytic unit 43 of each of the catalytic converters 40 is preferred to have a cell density of a value equal to or higher than 400 cells per square inch and, more preferably, of a value equal to or higher than 500 cells per square inch where the purifying performance is desired to be increased. Considering that although with the cell density increased, the honeycomb surface area as defined previously correspondingly increases enough to increase the capability of substantially purifying the exhaust gases, it also results in increase of the flow resistance of the exhaust gases, accompanied by reduction in engine performance. Therefore, the cell density is preferably not higher than 800 cells per square inch to avoid the excessive flow resistance occurring.

The exhaust gas purifying capability of each of the catalytic converters 40 will now be descried. In the upstream catalytic unit 42 employed in each of the catalytic converters 40, palladium reacts with the HC component contained in the exhaust gases G and, on the other hand, when the exhaust gases G containing a high concentration of fuel flow thereinto, rhodium reacts with the CO component generated from the palladium. Accordingly, the exhaust gases G can be substantially purified by the synergic effects of rhodium and palladium. Also, as described above, in each of the catalytic converters 40, the exhaust gases G can be substantially purified, with no local variation, due to the presence of the space 44 delimited between the upstream and downstream catalytic units 42 and 43.

In addition, although the exhaust gas purifying capability depends on the honeycomb surface area in which the catalyst is carried, not on the total amount of the catalyst used, since the honeycomb surface area increase as a result of the downstream catalytic unit 43 having a high cell density of 600 cells per square inch, the purifying capability can be increased by a degree corresponding to the quantity of the honeycomb surface area increased. Moreover, since the amount of rhodium, which is the major catalyst element most effective to remove the CO and HC compounds contained in the exhaust gases G, carried by the corresponding honeycomb carrier structure in the downstream catalytic unit 43 is greater than that in the upstream catalytic unit 42, a sufficient purifying capability is secured. Accordingly, increase of the purifying capability of each of the catalytic converters 40 can be appreciated.

On the other hand, since the downstream catalytic unit 43 makes use of the honeycomb carrier structure having a high cell density with the honeycomb surface area increased and does therefore has the purifying capability increased by a degree corresponding to the amount of the honeycomb surface area increased, the honeycomb capacity can be reduced where the same purifying capability is desired, and, therefore, the length L2 thereof as measured in the direction conforming to the longitudinal axis C is chosen to be smaller than the length L1 of the upstream catalytic unit 42. Accordingly, the size of the respective catalytic converter 40 can be reduced in a quantity corresponding to the quantity of the capacity of the downstream catalytic unit 43 so reduced. Also, since the respective catalytic converter 40 includes the two, i.e., upstream and downstream catalytic units 42 and 43 both accommodated within the single tubular casing 41, the catalytic converter 40 represents a single assembly and can be easily handled.

Since each of the catalytic converters 40 is of such a structure that the honeycomb capacity will not decrease because of the cell density of the honeycomb carrier structure in the upstream catalytic unit 42 being low as is the case with the conventional case, a substantial amount of inexpensive palladium is carried thereby as a catalyst. On the other hand, while the honeycomb carrier structure of the downstream catalytic unit 43 carries a larger amount of expensive rhodium per unit capacity than that in the honeycomb carrier structure of the upstream catalytic unit 42, the honeycomb capacity of the downstream catalytic unit 43 is small as a result of the cell density being high. Since the total amount of the catalyst is proportionate to the honeycomb capacity, even in the case that the amount of the catalyst carried per capacity is large, the total amount of the catalyst including the major catalyst element can be reduced in a quantity corresponding to the amount of the honeycomb capacity reduced and, as a result thereof, the total amount of the expensive rhodium used can be suppressed. Accordingly, the catalytic converter 40 is effective to reduce the cost of the material due to the catalyst reduced. Also, although rhodium is a catalyst metal that is a rare metal because of an insignificant quantity thereof being placed in the market, reduction in total amount achieved in the manner described hereinbefore brings about such an advantage that even when the production of the catalytic converters 40 increases, the required amount of rhodium can be easily secured.

It is to be noted that although each of the catalytic converters 40 has been shown and described as made up of the tubular casing 41, having a substantially identical diameter over the entire length thereof, and the two catalytic units 42 and 43 positioned within such tubular casing 41 and spaced a distance from each other, the respective catalytic converter may be so designed and so configured that using a tubular body having two longitudinal locations thereof coaxial with each other, but having diameters different from each other, catalytic units of respective diameters different from each other may be accommodated within such tubular body. Also, the catalytic converter may have catalytic units more than two. In such case, in at least two of three or more catalytic units are such that the catalytic unit positioned downstream should have the cell density higher than that of the catalytic unit positioned upstream, should have the honeycomb capacity smaller than that of the upstream catalytic unit and should include the larger amount of the element, due to become the major catalyst, carried per unit capacity than that in the upstream catalytic unit.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An exhaust gas purifying apparatus disposed on an exhaust passage, through which exhaust gases emitted from a combustion engine flows, for purifying those exhaust gases by means of a catalytic reaction, which apparatus comprises:
   a plurality of catalytic units disposed in series with each other in a direction conforming to the direction of flow of the exhaust gases;
   each of those catalytic units including a honeycomb carrier structure and a catalyst carried by the honeycomb carrier structure; and
   in at least two of the plural catalytic units, a downstream catalytic unit positioned downstream with respect to the direction of flow of the exhaust gases has a higher cell density, a smaller capacity of the honeycomb carrier structure and a larger amount of an element, due to become a major catalyst, carried thereby per unitary capacity than those in an upstream catalytic unit positioned upstream of the downstream catalytic unit, wherein the upstream and downstream catalytic units are retained within a single tubular casing having a longitudinal axis conforming to the direction of flow of the exhaust gases and are axially spaced a distance from each other,
   the tubular casing is accommodated within a catalytic tube, forming a part of the exhaust passage, and
   the tubular casing is welded to the catalytic tube at a portion thereof aligned with an axial space defined between the upstream and downstream catalytic units by means of welding.

2. The exhaust gas purifying apparatus as claimed in claim 1, in which the element due to become the major catalyst element is rhodium.

3. The exhaust gas purifying apparatus as claimed in claim 2, in which the honeycomb carrier structure of the downstream catalytic unit carries a catalyst composition containing rhodium and platinum, in which the proportion of platinum used is greater than that of rhodium used in weight based percentage.

4. The exhaust gas purifying apparatus as claimed in claim 1, in which paradigm is contained in the catalyst used on the upstream catalytic unit.

5. The exhaust gas purifying apparatus as claimed in claim 4, in which the honeycomb carrier structure of the upstream catalytic unit carries a catalyst composition containing rhodium and palladium, in which the proportion of palladium used is greater than that of rhodium used in weight based percentage.

6. The exhaust gas purifying apparatus as claimed in claim 1, the honeycomb carrier structure of the downstream catalytic unit is made of a metallic material and has a cell density equal to or higher than 400 cells per square inch.

7. The exhaust gas purifying apparatus as claimed in claim 6, in which the cell density of the honeycomb carrier structure of the downstream catalytic unit is equal to or higher than 500 per square inch.

8. The exhaust gas purifying apparatus as claimed in claim 6, in which the cell density of the honeycomb carrier structure of the downstream catalytic unit is equal to or lower than 800 cells per square inch.

9. A motorcycle comprising the exhaust gas purifying apparatus as claimed in claim 1.

10. The exhaust purifying apparatus as claimed in claim 1 wherein the cell density of the upstream catalytic unit is less than the cell density of the downstream catalytic unit, a length of the upstream catalytic unit along a longitudinal axis of the catalytic tube is greater than a length of the downstream catalytic unit and the axial space between the upstream catalytic unit and the downstream catalytic unit is open and configured of a length to enable mixing of the exhaust gas from the upstream catalytic unit before entering into the shorter length downstream catalytic unit.

11. The exhaust gas purifying apparatus as claimed in claim 10 wherein the tubular casing internal diameters are the same for the upstream catalytic unit, the open axial space and the downstream catalytic unit.

12. The exhaust gas purifying apparatus as claimed in claim 10 wherein the cell density of the upstream catalytic unit is less than the downstream catalytic unit and a ratio of cell density between the upstream catalytic unit and the downstream catalytic unit is configured to enable a maximum catalyst internal temperature of the downstream catalytic unit to be approximately equal to the maximum catalyst temperature of the upstream catalytic unit.

13. The exhaust gas purifying apparatus as claimed in claim 1 wherein the cell density of the upstream catalytic unit is within a range of 200 to 400 cells/in$^2$ and the cell density of the downstream catalytic unit is approximately 600 cells/in$^2$.

14. The exhaust gas purifying apparatus as claimed in claim 13 wherein the tubular casing internal diameter is the same for both the upstream catalytic unit and the downstream catalytic unit.

15. The exhaust gas purifying apparatus as claimed in claim 14 wherein the cell density of the upstream catalytic unit is less than the downstream catalytic unit and a ratio of cell density between the upstream catalytic unit and the downstream catalytic unit is configured to enable a maximum catalyst internal temperature of the downstream catalytic unit to be approximately equal to the maximum catalyst temperature of the upstream catalytic unit.

* * * * *